Patented Apr. 27, 1937

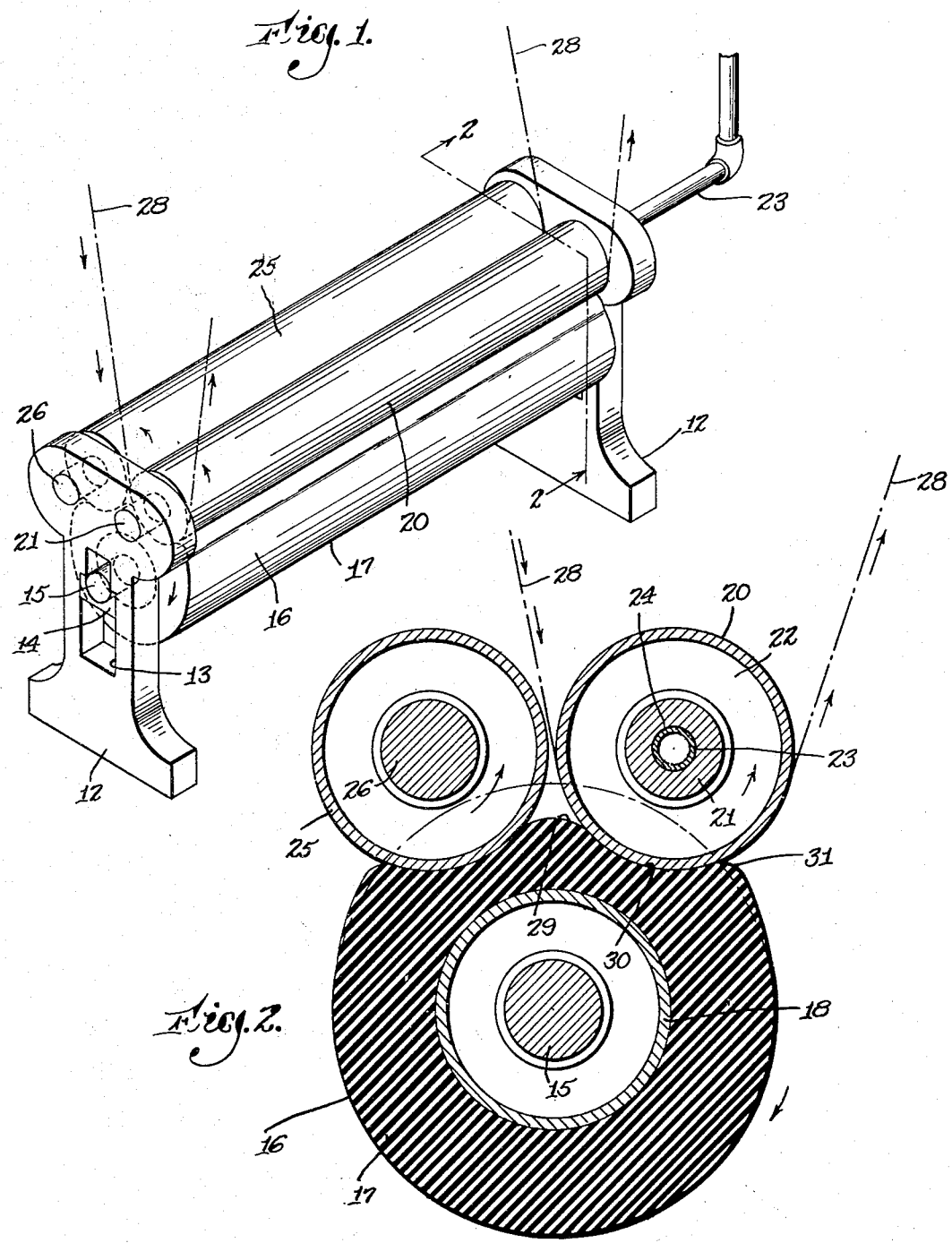

2,078,721

UNITED STATES PATENT OFFICE 2,078,721

DEVICE FOR SHRINKING CLOTH

Leon J. Scanlon, Taunton, Mass.

Application August 27, 1935, Serial No. 38,078

9 Claims. (Cl. 26—18.6)

This invention relates to a device for shrinking cloth.

One object of my invention is to make a device for shrinking cloth which takes advantage of the natural elasticity or pliability of a material such as rubber to accomplish the shrinking, thereby providing more compact and less expensive apparatus to do this than heretofore known.

Another object is to make such a device that is safer to use and one which is less exposed to soiling by dirt and dust than any heretofore known. Still another object is to so construct my machine that it will be more economical to build and to operate than those now in use.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and, therefore, I am not to be limited to the construction disclosed by the drawing; but am entitled to all such changes therefrom as fall within the scope of my claims.

In the drawing:

Figure 1 is a perspective view of my cloth shrinking device.

Figure 2 is a section taken on the line 2—2 of Figure 1, which clearly shows the appearance of the rubber roll while under pressure of the other rolls during operation of the machine.

As illustrated, there are supporting standards 12 each having a slot 13 therein in which bearing blocks 14 are mounted. There is a stub shaft 15 mounted in each said bearing block 14, which stub shafts 15 extend into a roll 16 which, as shown, serves as the driver roll and also the cloth shrinking roll. Its outer portion 17 is made of a resilient material, preferably soft, live rubber, which will yield where pressure is applied to it, as illustrated in Figure 2 of the drawing, and resume its shape when said pressure is withdrawn. A metal drum 18 carries said outer rubber portion 17, in which drum 18 said stub shafts 15 extend. Said roll 16 may be composed entirely of rubber material, although it is more economical and otherwise preferable to use only rubber thick enough to accomplish the desired shrinking.

Contacting with said rubber roll 16 is a hard roll 20 preferably made of metal, in the ends of which are stub shafts 21 mounted in said standards 12. This roll 20 is hollow as indicated at 22 and during operation of my device it is heated by a supply of live steam entering it through a conduit 23 which is connected to a source of supply, not shown. Said stub shaft 21 is hollow as at 24 and said conduit 23 enters it to thereby supply steam to said roll 20.

There is another hard or metal roll 25 similar to said roll 20, but spaced therefrom, which is not heated with steam. It serves in cooperation with said hard roll 20 to compress a portion of said rubber roll 16. At the ends of said roll 25 stub shafts 26 extend thereinto, being mounted in said standards 12.

I make the said rubber roll 16 preferably about twice the diameter of either of the said rolls 20 and 25, which latter rolls are about the same size. These proportions may be varied and the actual size of these three rolls depends upon the kind and size of cloth to be shrunk. For some work a rubber roll of 18 inches diameter and metal rolls of 9 inches diameter are suitable.

I prefer to have the said rubber roll 16 act as a driver, serving to rotate the other two rolls 20 and 25 in a direction opposite to the direction of its rotation. The cloth 28 to be shrunk enters from the top between the two rolls 20 and 25, contacting with the steam heated roll 20 and with said rubber roll 16 at a point 29 where said rubber roll 16 is shown bulged. Said cloth 28 then passes to the most compressed portion 30 of said rubber roll 16, and as the friction between cloth and rubber is greater than between metal and cloth, said cloth 28 clings to said rubber portion 17. Inasmuch as the rubber is compressed, which causes unevenness in its outside surface, it thereby acquires a greater surface length which the cloth follows, and then as the pressure on said rubber portion 17 diminishes towards the outside of said rolls 16 and 20 the surface length of the rubber diminishes, with the result that the cloth between said rolls shrinks or diminishes with it, and thereby becomes shorter than before it was run between said rolls. In other words, as the roll 16 tends to assume its original shape, its outer surface, on which the cloth 28 travels, becomes shorter, the depression in said rubber portion becoming less as the pressure is removed with a corresponding shortening of its length, and inasmuch as the cloth 28 follows with said rubber portion 17 it also becomes shorter or shrunk. During the travel between said rolls 16 and 20 the said heated roll 20 has drawn the moisture from the cloth, thereby setting the cloth in its shrunken condition at the point 31 where it emerges from said rolls.

The pressure on said rubber roll 16 may readily be varied in accordance with the degree of shrinkage desired, by raising or lowering said bearing blocks 14.

Said cloth 28 is given a finish as it passes between said rolls 16 and 20, as well as being shrunk.

What I claim is:

1. A cloth shrinking device comprising a plurality of rolls rotatably mounted therein, one said roll embodying a resilient portion, and two said rolls adjacent each other, in contact with and pressing into an upper part of said resilient portion and distorting all of said upper part immediately between said two rolls.

2. A cloth shrinking device comprising a plurality of rolls rotatably mounted therein, one said roll embodying a resilient portion, and two said rolls horizontally opposite and adjacent each other, in contact with and pressing into said resilient portion and distorting all of said resilient portion they contact with and all of said resilient portion immediately between the points of said contact.

3. A cloth shrinking device comprising a plurality of rolls rotatably mounted therein, one said roll embodying a resilient portion, and two said rolls pressing into and so distorting the part of said resilient portion immediately between them that it is below the normal circumference of said first-mentioned roll.

4. A cloth shrinking device comprising a driver roll and two driven rolls rotatably mounted therein, said driver roll being larger than and in driving contact with the two said driven rolls, said larger roll embodying a resilient portion, said driven rolls being harder than and pressing into said resilient portion and compressing that part of said resilient portion immediately between said two driven rolls below the normal circumference of said driver roll, and distorting those parts of said resilient portion immediately outside said two driven rolls beyond the normal circumference of said driver roll.

5. A cloth shrinking device comprising three rolls rotatably mounted therein, one said roll embodying a resilient outer portion, the other two said rolls embodying a harder outside portion contacting with and so distorting said resilient portion that its parts in direct contact with said two rolls are below the normal circumference of said resilient roll, and its part immediately between said two rolls is below the normal circumference of said resilient roll and extends outwardly beyond said directly contacted parts, and its parts immediately outside said two rolls bulge outwardly beyond the normal circumference of said resilient roll.

6. A cloth shrinking device comprising three rolls rotatably mounted therein, one said roll embodying a resilient outer portion, the other two rolls embodying a harder outside portion adapted to compress said resilient portion, said other two rolls being in contact with and distorting said resilient portion and so positioned with respect to each other and said resilient portion that they distort inwardly the parts of said resilient portion they directly contact with, that part immediately between said other two rolls extending outwardly beyond the said contacted parts.

7. A cloth shrinking device comprising a plurality of rolls rotatably mounted therein, one said roll embodying a resilient portion, and two other said rolls sufficiently spaced from each other to permit cloth to pass therebetween pressing into and so distorting said resilient portion that the nip formed between said resilient portion and a said other roll is radially inward of the point in said resilient portion where the cloth leaves said rolls.

8. A cloth shrinking device comprising a plurality of members rotatably mounted therein, one said member embodying a resilient portion, and two said members adjacent each other and in contact with and pressing into said resilient member and distorting all of said resilient portion immediately between said two members.

9. A cloth shrinking device comprising a plurality of members rotatably mounted therein, one said member embodying a resilient portion, and two said members being of smaller diameter and having a harder surface than the first-mentioned member and so positioned that they contact with different parts of said resilient portion and distort all of said resilient portion immediately between said two members.

LEON J. SCANLON.